United States Patent Office 3,365,507
Patented Jan. 23, 1968

3,365,507
CYCLIC OLIGOMER RECOVERY PROCESS
Zeb William Rike III, Orange, Tex., assignor to E. I. du Pont de Nemours and Company, Wilmington, Del., a corporation of Delaware
No Drawing. Filed Apr. 6, 1966, Ser. No. 540,522
6 Claims. (Cl. 260—666)

This process relates to the recovery of cyclic oligomers, and, more particularly, to the recovery of 1,5,9-cyclododecatrienes from the reaction product obtained from the trimerization of butadiene or substituted butadiene.

It is known that 1,3-diolefins can be converted to cyclic oligomers in the presence of Ziegler-type catalysts, which catalysts can be formed by reacting a titanium compound with a reducing compound such as one of the alkyl aluminum halides. The reaction product from the oligomerization contains active catalyst, which catalyst can cause violent exothermic polymerization of the oligomer when it is heated, for example, when recovery of pure oligomer is attempted by distillation. Thus, any catalyst must be deactivated before recovery of the oligomers by distillation, and, to this end, compounds such as water, alcohols and acetone have been employed. The halides derived from the catalyst which are liberated as the halogen acid by these conventional deactivating agents add to the carbon-carbon double bonds of the oligomers thereby producing organic halides which are extremely difficult to remove. These organic halides in even trace of quantities interfere with further reactions of the oligomers, e.g., oxidation, epoxidation, and hydrogenation by causing side reactions or by poisoning catalysts. In addition, the organic halides lead to corrosion of processing equipment.

The present invention provides a process for recovering cyclic oligomers with a minimal formation of organic halides by the addition of anhydrous ammonia to the reaction product of the oligomerization followed by rapid vaporization of the volatile portions of the product thus treated. The condensed vapors contain ammonium halides and the oligomers substantially free from organic halides. The ammonium halide is readily separated from the oligomers and the oligomers are refined by conventional distillation procedures. The catalyst residue and polymer formed during the oligomerization reaction are removed as tails from the vaporizer.

The present process is applicable to many oligomers especially those oligomers having 8 to 18 carbon atoms which may rapidly be vaporized under conditions which minimize the formation of organic halides and polymers, i.e., low temperatures and short holdup times. This process is particularly applicable to 1,5,9-cyclododecatrienes and catalysts containing chlorides.

Commercially-available anhydrous ammonia is operable in the present process and should be introduced in amounts sufficient to react with all halide contained in the catalyst. Usually, a minimum of 1.5 moles of ammonia per atom of halogen in any form is required and an excess of the foregoing amount can be employed depending upon the physical characteristics of the system.

Common types of evaporation may be employed in the present process provided that the holdup time of the reaction product at elevated temperatures, i.e., temperatures in excess of about 140° C. in the case of vapor and 220° C. in the case of liquid is held at a minimum because the formation of organic halides increases as the temperature increases. Vaporizations conducted at vapor temperatures in the range 70° to 140° C. with a holdup time of less than four minutes are operable but instantaneous vaporization within the aforementioned range of temperatures is preferred.

If desired, water may be added to the oligomer vapor prior to condensation to produce a two-phase condensate with substantially all of the inorganics present in the water phase and the oligomer as the organic phase. These phases may be separated by centrifugation to recover a relatively pure oligomer.

The following examples are presented to illustrate and not to restrict the present invention. Parts and percentages are by weight unless otherwise indicated.

EXAMPLES 1–6

Butadiene was trimerized to cyclododecatriene and the reaction product was treated according to the process of the present invention.

Trimerization was conducted in a three-stage reactor system. The first two stages consisted of agitated baffled vessels having a capacity of about 1.5 liters each and were equipped with a cooling coil, thermocouple, a gas inlet below the agitator and a reflux condenser for the off-gas with the provision for maintaining a pressure in the vessels of approximately 1–1.5 pounds per square inch gage. The third stage was an unagitated tube having a capacity of .415 liter. The reaction product passed between stages by overflow. Approximately 1 liter of dry cyclododecatriene was charged to each of the first two stages of the reactor system and dry rubber grade butadiene was vaporized and fed to each stirred vessel at a rate sufficient to maintain a small off-gas flow. The catalyst was introduced into the first stage and consisted of ethylaluminum sesquichloride as a 20% solution in cyclododecatriene, titanium tetrachloride as a 5% solution in cyclododecatriene and water in a molar ratio of 10/1/4.4, respectively, at the rate of 0.6 gram per hour of titanium tetrachloride. All stages were held at approximately 75° C. As the reaction products were removed from the third stage, approximately 0.25% by weight of ammonia based upon the weight of the reaction product was added to the product by bubbling ammonia through the product as collected. The ammonia treated product was directed to a stainless steel, agitated, thin film evaporator, 3¼" internal diameter by 18" high. This evaporator which was equipped with an oil jacket for heating and a standard condenser was operated at the pressure and feed rate indicated in Table I. The temperature of the overhead vapor, the temperature of the tails, and the amount of tails exit the evaporator were noted and are recorded in Table I. The liquid holdup time in the evaporator for all examples was less than 30 seconds. Prior to condensation, using water in the jacket of the condenser at 10° C., liquid water was injected into the vapors in the amount of 1% by weight based upon the weight of the vapor. The condensate from each example was analyzed for organic chloride and the analyses are shown in Table I. The condensates from all examples containing water, ammonium chloride and cyclododecatriene were combined and the combination was centrifuged at 15° C. in a De Laval Gyro-Test centrifuge. A clear organic layer containing less than 1 part per million chlorine as inorganic chloride was obtained. Vacuum distillation of the organic layer yielded 1,5,9-cyclododecatrienes at a purity of 98.8 to 99.9% containing less than 2 parts per million chlorine as organic chloride.

TABLE I

| Example No. | Feed Rate (lbs./hr./ft.² of heated area) | Pressure (mm./Hg absolute) | Temperature, °C. | | Tails (percent by weight of feed) | Organic Chloride in distillate (p.p.m.) |
|---|---|---|---|---|---|---|
| | | | Head | Tails | | |
| 1 | 47.8 | *19 | 123 | 185 | 7.9 | 3.4 |
| 2 | 67.1 | *20 | 122.5 | 180 | 8.6 | 3.2 |
| 3 | 80.0 | *20 | 123 | 176–81 | 8.9 | 3.0 |
| 4 | 74.0 | *14 | 118 | 192–6 | 7.8 | 6.3 |
| 5 | 82.1 | 15 | 112 | 195 | 7.6 | 2.0 |
| 6 | 90.3 | 16 | 110 | 196 | 7.1 | <2 |

*These numbers represent the pressure measured by gauge but the actual pressure in the system considering the boiling point of cyclododecatriene would probably be 5–6 mm./Hg higher than the pressure shown on the gauge.

EXAMPLE 7

A reaction product obtained from the trimerization of butadiene with ammonia added as set forth in Examples 1–6 was fed to an extemporized wiped-film evaporator. This evaporator was a spinning-band distillation column, thirty-six inches in height by one inch in diameter and was fed at the rate of 10 ml./min. The heat input was adjusted to vaporize most of the feed at 50 mm./Hg absolute pressure. Catalyst residue, polymer and a minor amount of cyclododecatriene was collected in a pot at the bottom of the column. The vapors were condensed and washed with water to remove ammonium chloride to yield a product having approximately 9 p.p.m. chloride which could be subsequently distilled to yield cyclododecatriene having approximately 2 p.p.m. chloride as organic chloride.

I claim:

1. A process for recovering cyclic oligomers having 8 to 18 carbon atoms from the reaction product of an oligomerization conducted in the presence of a halide containing catalyst which consists essentially of adding substantially anhydrous ammonia to said reaction product in an amount sufficient to react with the halides present in the catalyst, rapidly vaporizing the volatile portions of the product thus treated, condensing substantially all of said vapor and recovering said oligomers.

2. The process of claim 1 wherein said oligomer is 1,5,9-cyclododecatriene.

3. The process of claim 2 wherein said halide is chloride.

4. The process of claim 3 wherein the reaction product is obtained by the oligomerization of butadiene.

5. A process for recovering 1,5,9-cyclododecatriene from the reaction product formed by contacting 1,3-butadiene with a catalyst comprising a titanium halide and an alkyl aluminum halide in a solvent which is substantially inert toward said butadiene and said catalyst at a temperature in the range of 25 to 100° C. which consists essentially of introducing 1.5 to 10.0 moles of substantially anhydrous ammonia per atom of catalyst halogen rapidly vaporizing the product thus treated, adding at least 1 percent by weight based upon the weight of the vapor obtained thereby of water and thereafter condensing the vapor to form an inorganic and organic phase and recovering cyclododecatriene from the organic phase thus obtained.

6. The process of claim 5 wherein said organic phase is separated from the said inorganic phase by centrifugation.

References Cited

UNITED STATES PATENTS 3,149,174  9/1964  Mueller _____ 260—666
3,214,484  10/1965  Wattenberg _____ 260—666

FOREIGN PATENTS 878,120  9/1961  Great Britain.

DELBERT E. GANTZ, Primary Examiner.

V. O'KEEFE, Assistant Examiner.